United States Patent
Simonsohn et al.

(10) Patent No.: US 10,971,832 B2
(45) Date of Patent: Apr. 6, 2021

(54) HIGH-POWER BUSHING FOR HARSH ENVIRONMENTS

(71) Applicants: Tyco Electronics Raychem GmbH, Ottobrunn (DE); Tyco Electronics UK Ltd, Swindon (GB)

(72) Inventors: Thilo Simonsohn, Munich (DE); Tortsten Friedrich, Martinsried (DE); Martin Hofmann, Tuntenhausen (DE); Laurence Mortimer, Gloucester (GB)

(73) Assignees: Tyco Electronics Raychem GmbH, Ottobrunn (DE); Tyco Electronics UK Ltd, Swindon (GB)

( * ) Notice: Subject to any disclaimer, the term of this patent is extended or adjusted under 35 U.S.C. 154(b) by 0 days.

(21) Appl. No.: 16/526,214

(22) Filed: Jul. 30, 2019

(65) Prior Publication Data
US 2019/0356068 A1    Nov. 21, 2019

Related U.S. Application Data

(63) Continuation of application No. PCT/EP2018/052363, filed on Jan. 31, 2018.

(30) Foreign Application Priority Data

Jan. 31, 2017  (EP) .................................... 17153982

(51) Int. Cl.
*H01R 11/01* (2006.01)
*H01B 17/26* (2006.01)
(Continued)

(52) U.S. Cl.
CPC ............. *H01R 11/01* (2013.01); *H01B 17/26* (2013.01); *H02G 3/22* (2013.01); *H01R 4/30* (2013.01); *H01R 2201/26* (2013.01)

(58) Field of Classification Search
CPC ...... H01R 11/01; H01R 4/30; H01R 2201/26; H01B 17/26; H02G 3/22
(Continued)

(56) References Cited

U.S. PATENT DOCUMENTS

| 4,166,194 A | * | 8/1979 | Bolin | .................... H01B 17/308 |
| | | | | 174/142 |
| 6,416,338 B1 | * | 7/2002 | Berlovan | ............... H01R 13/53 |
| | | | | 439/187 |

(Continued)

FOREIGN PATENT DOCUMENTS

| CN | 102194556 A | 9/2011 |
| CN | 203589462 U | 5/2014 |

(Continued)

OTHER PUBLICATIONS

PCT Notification, Transmittal of The International Search Report and The Written Opinion of the International Searching Authority, Int. App. No. PCT/EP2018/052363, dated Apr. 11, 2018, 15 pages.

(Continued)

*Primary Examiner* — Harshad C Patel
(74) *Attorney, Agent, or Firm* — Barley Snyder

(57) ABSTRACT

A bushing comprises an insulating body having a first body end portion, a second body end portion, and a body center portion connecting the first body end portion and the second body end portion, and a bushing conductor coaxially extending within and mechanically coupled to the insulating body. The bushing conductor includes a first connecting portion having a first end face at the first body end portion, a second connecting portion having a second end face at the second body end portion, and a center portion electrically and mechanically connecting the first connecting portion and the second connecting portion. The first connecting portion is elastically deformable with respect to the first body end portion along a radial direction and/or the second connecting (Continued)

portion is elastically deformable with respect to the second body end portion along the radial direction.

17 Claims, 5 Drawing Sheets

(51) Int. Cl.
    *H02G 3/22*     (2006.01)
    *H01R 4/30*     (2006.01)

(58) Field of Classification Search
    USPC .......................................................... 439/382
    See application file for complete search history.

(56) References Cited

U.S. PATENT DOCUMENTS

| | | | | |
|---|---|---|---|---|
| 7,674,124 | B2 * | 3/2010 | Nicholson | H01R 13/5202 |
| | | | | 439/281 |
| 2005/0260876 | A1 * | 11/2005 | Krause | H01R 13/53 |
| | | | | 439/181 |
| 2006/0148292 | A1 * | 7/2006 | Hughes | H01R 13/53 |
| | | | | 439/206 |
| 2009/0233472 | A1 * | 9/2009 | Hughes | H01R 13/53 |
| | | | | 439/181 |
| 2017/0331220 | A1 * | 11/2017 | Sebastián Martín | |
| | | | | H01R 31/065 |
| 2018/0286540 | A1 * | 10/2018 | Sumimoto | H01B 17/26 |
| 2019/0027313 | A1 * | 1/2019 | Bushong | H01G 4/232 |

FOREIGN PATENT DOCUMENTS

| | | |
|---|---|---|
| CN | 105393315 A | 3/2016 |
| JP | 47016988 | 9/1972 |
| JP | 52045090 | 4/1977 |
| JP | 53149691 | 12/1978 |
| JP | S59191215 A | 10/1984 |
| JP | S63298924 A | 12/1988 |
| JP | H07107608 A | 4/1995 |
| JP | H07272568 A | 10/1995 |
| JP | 09198944 A | 7/1997 |
| KR | 7107608 A | 4/1995 |
| KR | 7272568 A | 10/1995 |

OTHER PUBLICATIONS

Abstract of JPH07272568, dated Oct. 20, 1995, 1 page.
Abstract of JPS63298924, dated Dec. 6, 1988, 1 page.
Abstract of JP07107608, dated Apr. 21, 1995, 1 page.
Chinese Office Action and English translation, dated Apr. 7, 2020, 16 pages.
Japanese Office Action and English translation, dated Aug. 25, 2020, 16 pages.
Korean Office Action, dated Jul. 27, 2020, 8 pages.

* cited by examiner

HIGH-POWER BUSHING FOR HARSH ENVIRONMENTS

CROSS-REFERENCE TO RELATED APPLICATIONS

This application is a continuation of PCT International Application No. PCT/EP2018/052363, filed on Jan. 31, 2018, which claims priority under 35 U.S.C. § 119 to European Patent Application No. 17153982.8, filed on Jan. 31, 2017.

FIELD OF THE INVENTION

The present invention relates to a bushing and, more particularly, to a bushing for providing a connection between an external cable and a housing internal conductor.

BACKGROUND

In many technical fields electrical power has to be supplied by or to certain components, such as sophisticated switches, transformers, motors, and the like, which may frequently be positioned, at least partially, in an appropriate housing. On the other hand, outside the housing the required electrical power may be supplied by or to one or more appropriately dimensioned cables connected to a respective power supply or electric component, wherein the electrical power may be provided as AC or DC or both. Depending on the application under consideration the respective electrical power may range from several tens of kilowatts to several hundred of kilowatts and even higher, thereby requiring respective cable configurations in terms of cross-section and insulation characteristics. For example, high electrical power may frequently be provided in the context of medium voltages to high voltages, ranging from several hundred volts to several ten thousand volts, thereby resulting in relatively low currents to be conveyed in the external cables, while in other applications, relatively low voltages may be used, for instance in mobile DC applications, such as electric vehicles, thereby imposing superior requirements with respect on the drive current capability of the respective cables. In any case, the corresponding external cables may require an appropriate configuration with respect to conductor material, conductor cross-section, insulating sheath, and the like, thereby typically resulting in a cable configuration including one or more copper-based or aluminum-based core wires with a cross-section of several centimeters surrounded by an appropriate insulation or cover material that provides for the required insulating behavior and integrity of the entire cable. Since these cables may frequently be exposed to relatively harsh environments, for instance such cables may be exposed to outside conditions including exposure to direct sunlight, extreme temperatures ranging from −50° C. to 70° C., and the like, thereby necessitating the usage of appropriate sheath materials, which may therefore also contribute, in addition to the core material, to additional weight of the respective cables.

Power receiving components or power supplying components, such as switches, transformers, motors, and the like are often encapsulated in an appropriate housing so as to provide for superior integrity of such components or at least of any contact structures thereof. Due to the protected interior of the housing, any requirements for housing internal conductors may be significantly less stringent, thereby even allowing the usage of such housing internal conductors without external insulating material.

One critical interface of a housing internal conductor and an external cable represents a respective bushing, which is to be understood as a component that is appropriately mounted to the housing and provides a passage for the exchange of electrical power between the external cable and the housing. To this end, a corresponding bushing typically comprises a highly conductive metal conductor, typically in the form of a copper bolt, which is surrounded by an insulating material that is formed from an appropriate material, such as epoxy resin. Epoxy resin is known to exhibit high mechanical strength and stiffness and superior insulating characteristics. In order to provide a mechanically and electrically stable bushing, the metal core and the epoxy resin are typically formed into an integral component by, for instance, injection molding, thereby obtaining a robust and stiff product. Consequently, by providing an appropriate mounting flange at any appropriate position, the bushing may be inserted into a corresponding bore provided in the housing and may be fixed thereto by the mounting flange, thereby providing for high mechanical and electrical integrity of the resulting connection between an external cable attached to the bushing at one end thereof and a housing internal conductor connected to the bushing at the other end thereof.

These well-established high-power bushings, however, may suffer from increased failure events when used in applications associated with harsh external conditions. For example, the robust and stiff configuration of the conventional high-power bushing may exhibit an increasing number of device failures upon being exposed to relatively extreme temperatures, for instance ranging from approximately −40° C. to approximately 70° C., as are typically encountered under various environmental conditions in various geographic locations. For instance, power supply in many types of vehicles, such as trains, may result in exposure to harsh conditions, such as the above-referenced temperatures, for instance upon direct exposure to sunlight, while in cold winter days extremely low temperatures may occur. Such extreme temperatures may by itself represent a significant stress for the bushing, as typically epoxy resin and the usually highly conductive copper material may have very different coefficients of thermal expansion, which may result in cracks or any other damage in the insulating epoxy resin, in particular, when certain mechanical forces may additionally act on certain bushing components.

As an example, the external cable, which may have a relatively high weight, is typically connected to the bushing so that an end face of the copper bolt of the bushing is in firm contact with a respective end face of the external cable or a contact assembly connected thereto, which may result in a more or less pronounced bending force exerted on the copper bolt of the bushing. Under extreme temperature conditions, as discussed above, however, these relatively high bending forces may promote the creation of damage in the insulating material, since the difference in the thermal expansion in combination with the additional mechanical forces acting the copper bolt and hence on the epoxy resin may finally result in a breakage of the external sheath, thereby also typically resulting in a failure of the entire high-power connection. Similarly, at moderately high temperatures the mechanical properties of the epoxy resin may also be subjected to degradation, thereby also increasing the probability of resulting in a severe device failure.

The situation described above may even become worse in circumstances, in which the respective forces acting on certain components of the bushing may vary timely and spatially, for instance, when externally or internally induced vibrations are present. The source of such vibrations may be, for instance, in mobile applications the movement along respective railroad rails, wherein the joints between adjacent rails may cause significant vibrations in a more or less regular manner, depending on the overall speed of the respective electric vehicle and the distance of the joints. Similar vibrations, however, with reduced regularity, may be encountered in street-bound vehicles, wherein speed and surface conditions of a respective road may significantly determine the resulting "spectrum" of vibrations acting on the corresponding bushing components.

Moreover, in train applications or similar use cases, sophisticated contactors or switching devices may have to be used, in which moderately high masses are accelerated and moved during a corresponding switching process, thereby typically involving a direct impact of the corresponding contact components and introducing respective mechanical shocks and vibrations into the bushing components. Although rare events of such induced mechanical loads may not necessarily significantly affect the bushing and the electrical and insulating state of the various components, it turns out, however, that over an extended lifetime, which is typically required in many applications, such as 10 to 15 years, the conventional robust and stiff configuration, for instance obtained on the basis of an integrally molded epoxy resin and copper bolt component may result in a significant reliability issue, thereby rendering the conventional configuration less than desirable for a high-power bushing to be used in sophisticated environmental conditions.

SUMMARY

A bushing comprises an insulating body having a first body end portion, a second body end portion, and a body center portion connecting the first body end portion and the second body end portion, and a bushing conductor coaxially extending within and mechanically coupled to the insulating body. The bushing conductor includes a first connecting portion having a first end face at the first body end portion, a second connecting portion having a second end face at the second body end portion, and a center portion electrically and mechanically connecting the first connecting portion and the second connecting portion. The first connecting portion is elastically deformable with respect to the first body end portion along a radial direction and/or the second connecting portion is elastically deformable with respect to the second body end portion along the radial direction.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
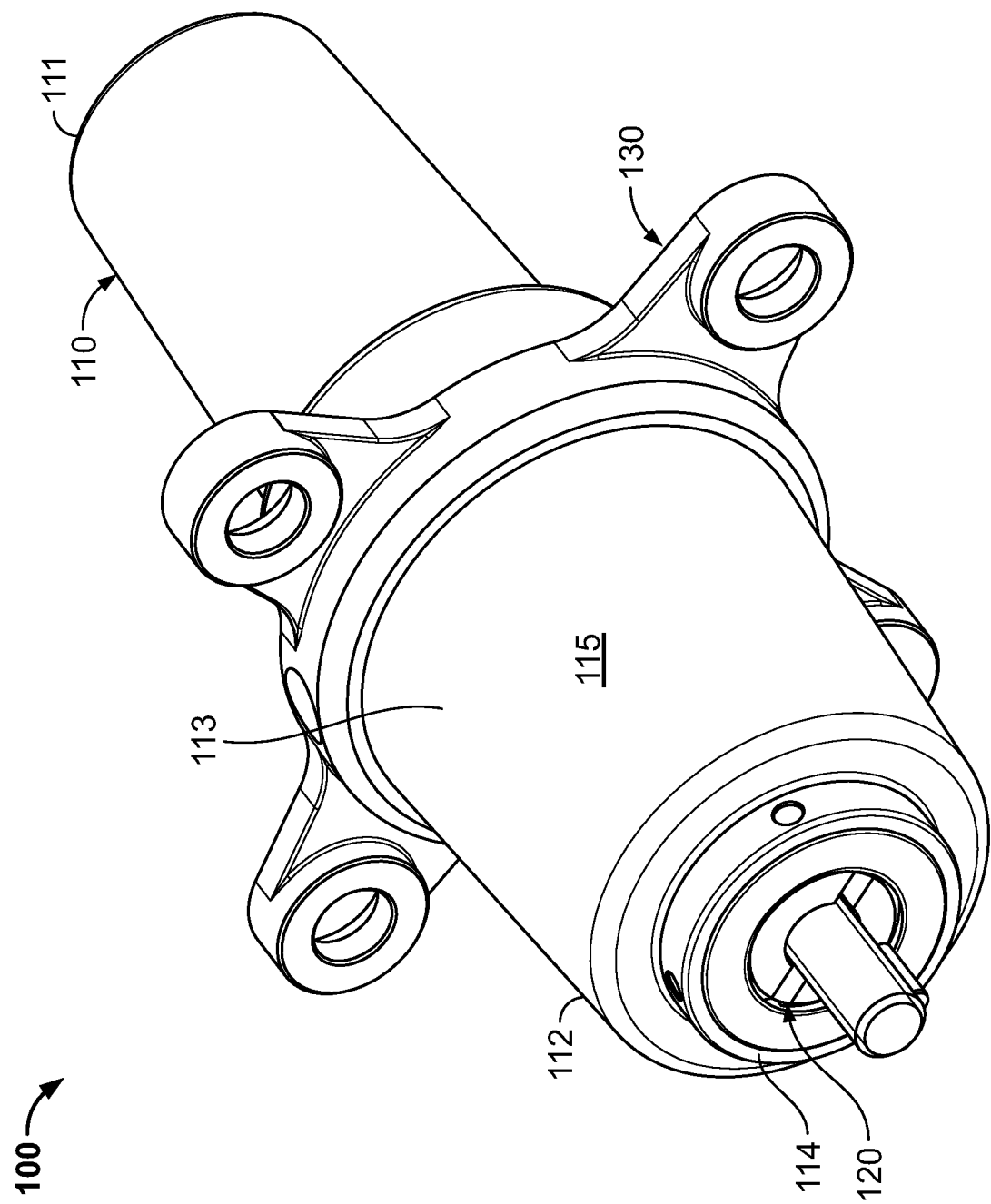
FIG. 1 is a perspective view of a bushing according to an embodiment.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will be thorough and complete, and will fully convey the concept of the disclosure to those skilled in the art.

A bushing 100 according to an embodiment, as shown in FIG. 1, is a connecting member for providing a passage in a wall of a housing so as to enable the exchange of high electrical power between an outside of the housing and an interior of the housing. In this context, high electrical power is to be understood as electrical power ranging from several tens of kilowatts, and in particular embodiments of hundred kilowatt, to several hundreds of kilowatts and even higher, wherein the high electrical power may be associated with a voltage in the range of several hundred volts to several kilowatt or even several tens of kilovolt, while the respective current may be determined by the corresponding supply voltage. Similarly, the electrical power may be supplied in the form of AC power or DC power, depending on the specific application under consideration. The bushing 100 comprises an elongated insulating body 110, which surrounds a bushing conductor 120 and which may be formed of any appropriate material, such as copper, copper alloys, aluminum, and the like. In an embodiment, the elongated bushing conductor 120 is provided in the form of a copper conductor having an appropriate shape, as will be described in more detail later on. The bushing conductor 120 extends coaxially within the insulating body 110 and is mechanically coupled to the insulating body 110.

The insulating body 110, as shown in FIG. 1, may functionally be divided into a first body end portion 111, a second body end portion 112, and a body center portion 113 that may be considered as an intermediate part connecting the first body end portion 111 and the second body end portion 112. It should be appreciated that the various portions are to be understood as functional portions with any appropriate dimensions, wherein the first body end portion 111 may represent a part of the bushing 100 that is basically configured to connect to a contact assembly for an external cable, while the second body end portion 112 is basically configured so as to protrude into a respective housing and connect to a housing internal conductor, which in turn may connect to any component accommodated in the housing, such as a switch assembly, a transformer terminal, and the like. Similarly, the functional body center portion 113 may represent a portion that is basically in contact with the housing so as to provide for an appropriate mechanical contact with the housing.

The insulating body 110 may be formed of any appropriate material or material composition so as to provide for electrical insulation on an outer surface of the insulating body 110, at least along the major part of the insulating body 110. In the embodiment shown in FIG. 1, the insulating body 110 may further comprise a conductive component, such as a metal sheath 114, which may therefore form an inner surface of the insulating body 110, as will be discussed in more detail with reference to FIG. 3. Moreover, in this specific embodiment the conductive sheath, which is also referred to as a shielding sheath 114, may be exposed along a certain length along a longitudinal direction of the insulating body 110 at the second body end portion 112. For example, the sheath 114 may be in tight contact with the bushing conductor 120 at the second body end portion 112 and/or parts of the body center portion 113, thereby providing for a mechanically robust and stiff configuration of the insulating body 110 and the bushing conductor 120 in the area of the second body end portion 112 and, at least partially, in the body center portion 113, as will also be discussed later on in more detail.

In an embodiment, the shielding sheath 114 may be made of aluminum, thereby providing similar characteristics with respect to thermal expansion compared to an insulating material 115 of the insulating body 110, when, for instance, epoxy resin is used for the material 115 of the insulating body 110. A thickness of the shielding sheath 114 may range from approximately 0.05 mm to 5 mm or higher, depending on the overall configuration. It should further be appreciated that the thickness of the shielding sheath 114 may vary along the length direction of the bushing 100, if considered appropriate for the overall configuration. In other embodiments the shielding sheath 114 may be provided in the form of coating whose thickness may be 0.5 mm and less. In an embodiment, the shielding sheath 114 is formed of a metal different from a metal of the bushing conductor 120.

The bushing conductor 120 may also be functionally divided into a first connecting portion substantially corresponding to the first body end portion of the body 110, a second connecting portion substantially corresponding to the second body end portion 112, and a center portion representing an intermediate portion between the first and second connecting portions, as will be discussed in more detail with reference to FIG. 3.

The bushing 100, as shown in FIG. 1, comprises a mounting flange 130, which is positioned at the body center portion 113 of the insulating body 110 and which is appropriately configured so as to be mounted to a respective housing, thereby allowing a firm mechanical connection of the bushing 100 to the corresponding housing. The mounting flange 130 is disposed at an axial position at which the bushing conductor 120 and the insulating body 110 are in contact with each other.

Figure 2:
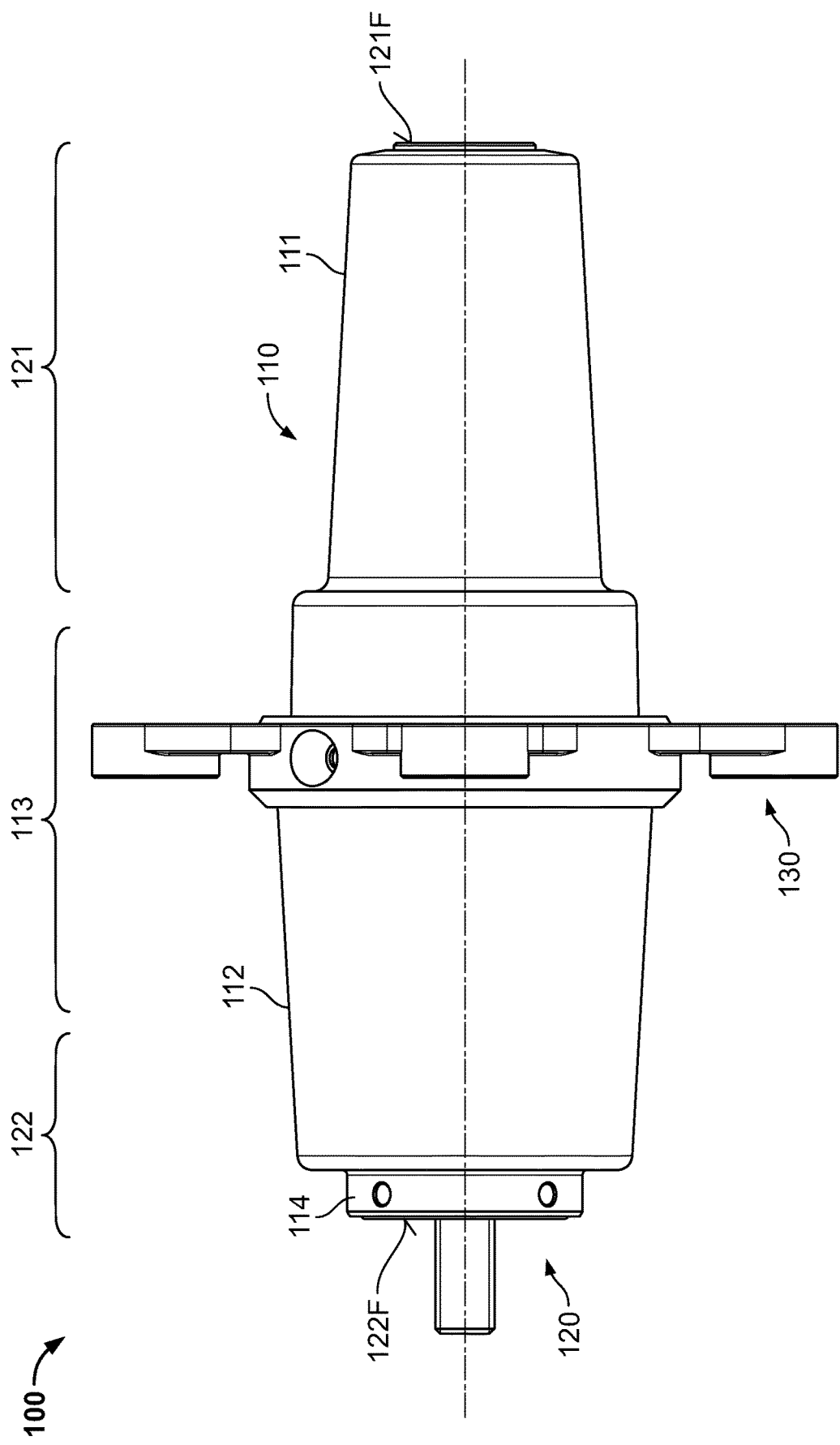
FIG. 2 is a side view of the bushing.

As shown in FIG. 2, the bushing conductor 120 includes a first end face 121F, which is exposed by the first body end portion 111 so as to allow mechanical and thus electrical contact to a respective terminal or end face of a contact assembly connecting to external cable or a corresponding connecting portion thereof, as will be explained with reference to FIG. 3. Similarly, the bushing conductor 120 comprises an exposed second end face 122F, which may allow mechanical and thus electrical contact to a respective housing internal conductor, as will also be discussed in more detail with reference to FIG. 3. In the embodiment shown in FIG. 2, the size and/or shape of the end face 121F may differ from the size and/or shape of the end face 122F so that these different portions of the bushing 120 may specifically be adapted to the respective requirements within the corresponding housing and outside of the housing. For example, frequently respective high power cables and their contact assemblies are provided in accordance with standardized dimensions and shapes and therefore the first end face 121F may specifically be adapted to such standardized requirements, thereby allowing connection to standard cables and/or contact assemblies. On the other hand, the second end face 122F may be appropriately selected so as to provide for reduced overall resistance and high mechanical robustness and allow connection to application-specific housing internal conductors. For example, as shown in FIG. 2, in illustrative embodiments a cross-sectional size of the end face 122F may be greater than the cross-sectional size of the end face 121F.

Figure 3:
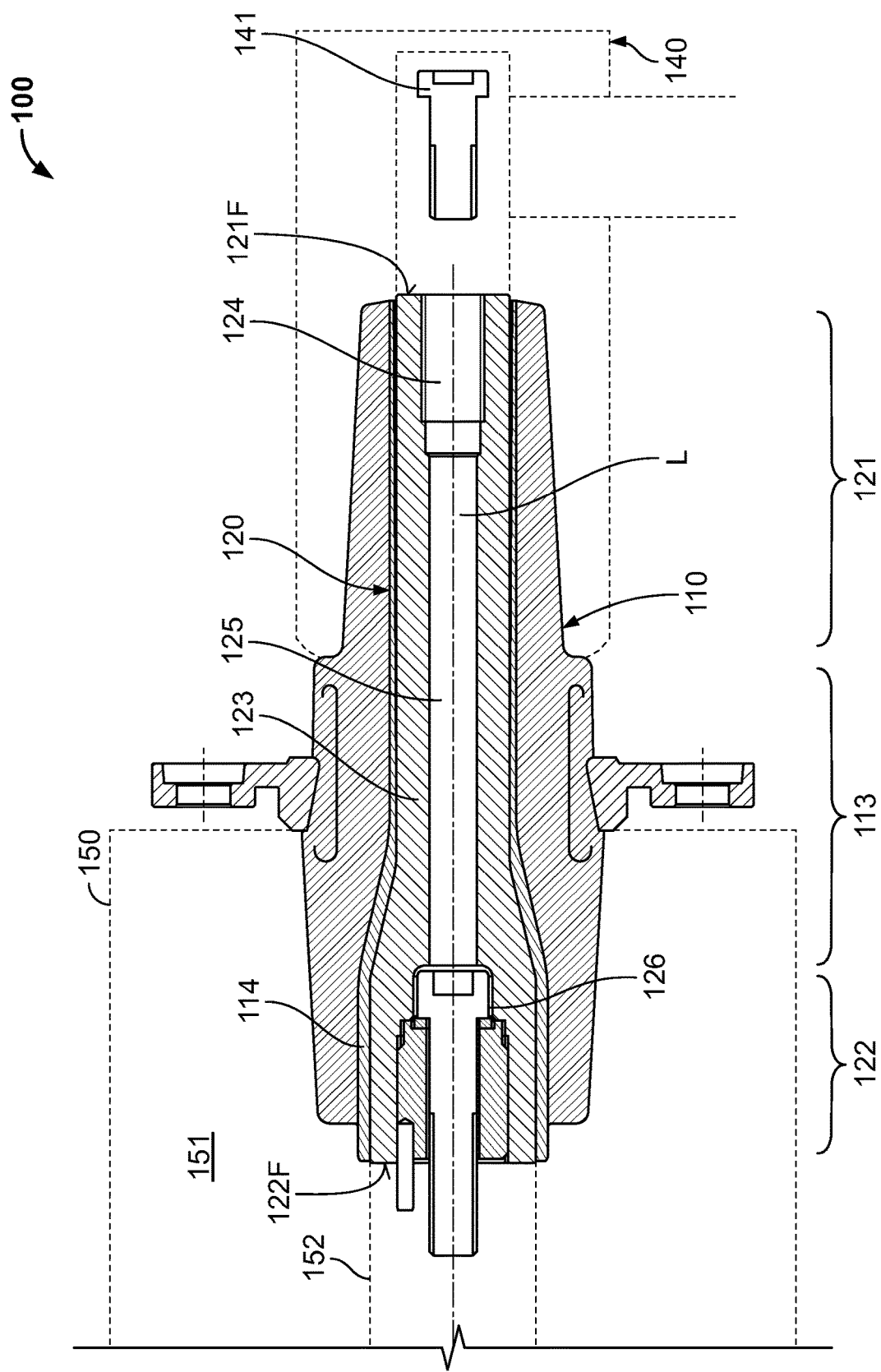
FIG. 3 is a sectional side view of the bushing mounted to a housing and connected to an external cable.

As shown in FIG. 3, the bushing 100 may be mounted to a housing 150, which may have any appropriate size and shape as determined by the specific application under consideration. For example, the housing 150 may typically represent a metal housing that accommodates specific electrical components, for instance as a switch assembly, such as a magnetic contactor, a transformer or at least a portion thereof, an electric motor or a contact portion thereof, and the like. The bushing 100 protrudes into the interior 151 of the housing 150 and may connect to any appropriate housing internal conductor 152, which may represent any appropriately dimensioned and shaped conductor for connecting to a further component, wherein in some cases the conductor 152 may even lack any external insulating liner due to the protected interior 151. Similarly, the bushing 100 may connect to a respective terminal portion or any other contact assembly provided in combination with an external cable or contact assembly 140. Consequently, the bushing conductor 120 may be connected with its connecting portion 121 to the terminal portion or contact assembly of the cable 140 so as to be in tight mechanical and thus electrical contact therewith. In particular, the end face 121F of the connecting portion 121 is in contact with a respective part of the cable 140 and may mechanically be fixed thereto by any appropriate fastening, such as a screw 141, which may be threaded into a corresponding bore 124 formed in the bushing conductor 120. As previously discussed, the fastening member 141 and the threaded bore 124 may be configured so as to comply with specified standards in order to allow the connection of any terminal portion or contact assembly that complies with the corresponding standards. Consequently, when the external cable or a corresponding terminal portion or contact assembly thereof is mechanically connected to the connecting portion 121, the electrical connection is established by the end face 121F and a corresponding surface portion of the cable 140, possibly in combination with the fastening member 141, while any outer surface areas of the connection portion 121 do not contribute to the electrical and mechanical connection with the cable 140.

Similarly, as shown in FIG. 3, a second connection portion 122 of the bushing conductor 120 may connect with its end face 122F to the housing internal conductor 152, wherein a respective mechanical connection may be established on the basis of any appropriate fastening, such as a threaded connection, and the like. For instance, in an embodiment, a screw 126 may be provided within the end portion 122 so as to allow a mechanical stable connection to the conductor 152. In an embodiment, the fastening member 126 may be inserted and operated through an inner bore 125, which extends along a length direction L through the entire bushing conductor 120. It should be appreciated that in this case the inner bore 125 may include the portion 124, possibly including a threaded inner surface, as discussed above, and a corresponding portion so as to accommodate the fastening member 126, such as a screw, and the like. Moreover, if required, a respective tool for operating the fastening member 126 may be inserted from the first connecting portion 121 prior to connecting the cable 140, for instance via an appropriate contact assembly, to the first connecting portion 121.

As shown in FIG. 3, the bushing conductor 120 may vary along the length direction L, wherein, as discussed above, in some embodiments the overall cross-sectional area at the first connecting portion 121 may be less compared to the second connecting portion 122. For example, at a center portion 123 of the bushing conductor 120, the cross-sectional shape of a transition area from the increased cross-sectional area of the second connecting portion 122 may change into the reduced cross-sectional area of the first connecting portion 121, thereby providing a tapering configuration. Based on this tapering configuration, a tight mechanical contact may be established between the insulating body 110 including the shielding sheath 114 positioned at its inner surface and the bushing conductor 120. For example, at least at the second connecting portion 122 and a part of the center portion 123, a form closure may be established between the bushing conductor 120 and the insulating body 110. In other cases, the form closure may exclusively be established in parts of the center portion 123. For example, in the region of the form closure between the insulating body 110 and the bushing conductor 120, respective external forces, for instance for mounting the bushing 100 to any other component, may efficiently be applied to the bushing 100 in its entirety, since the respective radial forces may be transferred from the insulating body 110 into the bushing conductor 120 due to the tight mechanical contact of these components. The connection of the bushing conductor 120 as form closure may be achieved by force-fit, form-fit or material fit (i.e. soldering) or mechanical elements like screws or combinations thereof.

In the area of the first connecting portion 121, the bushing conductor 120 is arranged such that it is elastically deformable with respect to the insulating body 110 at least in one radial direction, which is to be understood as a direction perpendicular to the length direction L. Although not shown in the drawings it is to be understood that in other embodiments instead of the first connecting portion 121 the second connecting portion 122 is arranged such that it is elastically deformable with respect to the insulating body 110. In other embodiments both the first and second connecting portions 121, 122 are elastically deformable with respect to the insulating body 110.

In the remaining description, features and advantages of the elastic deformation capability of the first connecting portion 121 will be described without specific reference to the second connecting portion. However, any of these features and advantages also applies to embodiments in which the second connecting portion or both the first and the second connecting portion are elastically deformable. Furthermore, providing a clearance according to the present invention is also helpful when dealing with plastic deformation of the bushing conductor 120. Such plastic deformation may happen under severe mechanical overload which might occur only once or a few times during the life-time of the bushing.

The elastic deformation is meant to include a movement of a part of the bushing conductor 120 or deformation/bending with a substantial degree of reversibility of a part of the bushing conductor 120. Thus, the amount of displacement/re-location of the deformation versus the insulating body 110 is varying along its length. The displacement or deformation starts at zero in the area of the connection to the insulating body 110 and increases towards its maximum value at the end. As a consequence, upon connecting the cable 140 by any appropriate terminal portion or contact assembly to the connecting portion 121 in order to establish at least electrical contact between the end face 121F and the contact assembly connecting to the cable 140, a radial force exerted on the first connecting portion 121 by the attached cable 140 may result in a corresponding radial deformation of the connecting portion 121 with respect to the first body end portion of the insulating body 110. The same holds true for the second connecting portion 122 when connecting the second connecting portion 122 with the housing internal conductor.

As previously discussed, even the moderate weight of the cable 140 may result in significant radial forces acting on the connecting portion 121 which may, without providing the elastic deformation function, result in severe stresses between the bushing conductor 120 and the insulating body 110 when conventionally formed as an integral component based on epoxy resin and a copper bolt. According to the present invention, however, the connecting portion 121 may respond to a corresponding radial force by elastic deformation, thereby significantly reducing any mechanical stress transferred into the insulating body 110 thus reducing the risk of damage and device failure even over a prolonged specified lifetime of the bushing 100. In particular, the connecting portion 121 having the elastic deformation capability, and/or the connecting portion 122 when having the elastic deformation capability, may also appropriately respond to any type of vibrations or oscillations such that any mechanical stress associated with such vibrations may substantially not be coupled into the insulating body 110 or may at least be significantly damped, thereby also contributing to superior reliability of the insulating body 110 and thus of the entire bushing 100. It should be appreciated that one or both connecting portions 121, 122 may also favorably respond to a static load acting on the bushing 100 by taking on a more or less static deformation.

In the embodiment shown in FIG. 3, the insulating body 110 has superior electric integrity due to the provision of the shielding sheath 114 at the inner surface thereof due to the shielding effect, while also providing for superior contact characteristics with the bushing conductor 120 along a respective length, for instance in the center portion 123, in which a tight mechanical contact due to form closure between the insulating body 110, i.e. the shielding sheath 114, and the conductor 120 is established. Thus, in addition to superior shielding effect also high mechanical strength for connecting the bushing 100 to the housing 150 may be achieved, while also a tight mechanical and electrical connection to the housing internal conductor 152 is established. On the other hand, the capability of elastic deformation of the connecting portion 121 with respect to the insulating body 110 may still provide for a significant degree of mechanical decoupling in this area of the bushing 100, thereby significantly reducing any mechanical stress in the relevant part of the insulating body 110 upon occurrence of bending or radial forces, mechanically induced vibrations, which may be caused by components within or in the vicinity of the housing 150 or by vibrations transmitted via the cable 140.

Figure 4:
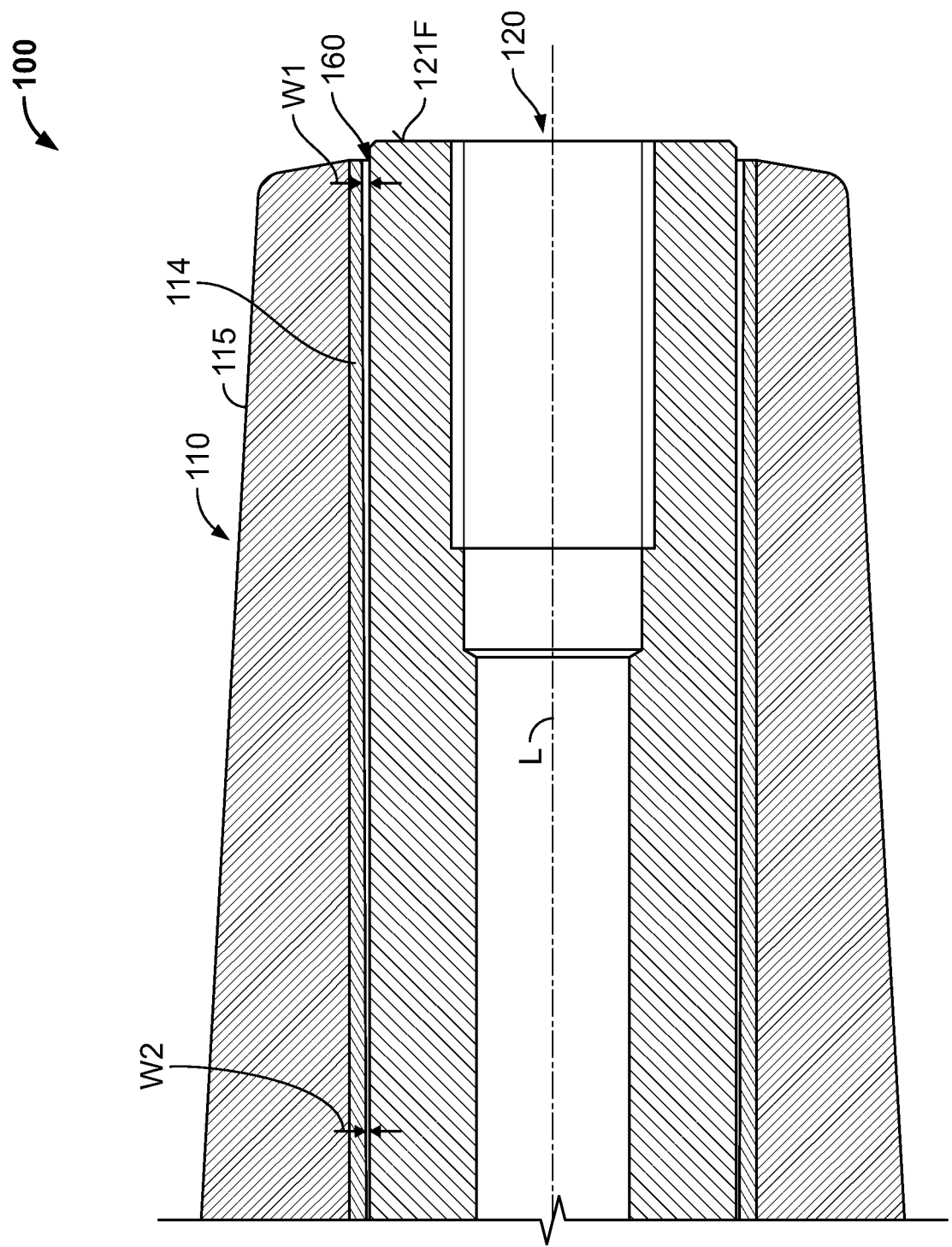
FIG. 4 is an enlarged sectional side view of a portion of the bushing.

As shown in FIG. 4, the elastic displacement or deformation capability of the first connecting portion 121 of the bushing conductor 120 in one embodiment is established on the basis of a clearance 160 formed between the relevant portion of the insulating body 110, which in the embodiment shown includes the shielding sheath 114 and the connecting portion 121 of the conductor 120. In the embodiment shown, the clearance 160 may represent a substantially material-free space so as to allow a displacement or deformation of the portion 121 in at least one radial direction, i.e. in at least one direction perpendicular to the length direction L. In other embodiments, the clearance 160 may be provided so as to allow elastic deformation or displacement in any radial direction, as will be discussed later on in more detail with reference to FIG. 5A.

In the embodiment shown in FIG. 4, the clearance 160 may have a tapered shape in the cross sectional view, which means that a width of the clearance 160 may gradually increase towards the end face 121F. For example, at any appropriate position in the center portion of the bushing 100 the insulating body 110 and the conductor 120 may be in close contact with each other and may then begin to separate, thereby establishing a small width W2, which increasingly becomes greater when approaching the end face 121F, thereby establishing a final width W1. For example, the gradual increase of the clearance 160 towards the end face 121F may be obtained by correspondingly reducing a cross-sectional size of the insulating body 110 and/or the conductor 120 so as to obtain the desired final width W1. In an embodiment, the clearance 160 has a width W1 in a range of up to 5 mm or up to 5% of a length of the first connecting portion 121 and/or the second connecting portion 122. In some embodiments, the width W1 may range from 0.1 mm to 1.0 mm, depending on the overall range of deformation required for accommodating the respective radial forces. It should be appreciated that the application specific width of the clearance 160 may readily be determined by experiment and/or simulations, wherein the overall cross-sectional size of the conductor 120, the geometry of the cross-section, the material characteristics and the type and amplitude of corresponding vibrations and/or radial forces may be entered into the simulations in order to obtain the required width W1. It should be appreciated that a length dimension of the clearance 160, i.e. a length of the space with non-zero width to the end of the insulating body 110, may range from 15 mm to 300 mm in illustrative embodiments. In other embodiments, the length dimensions of the clearance 160 may be less than 15 mm or greater than 300 mm. It should further be appreciated that the width of the clearance 160 may be defined by a representative value or width so as to define a characteristic measure of the clearance. Such a representative width may be defined as the width W2, a width averaged along the length of clearance 160, in which a non-zero distance between the components 110 and 120 is established, and the like.

In other embodiments, the width of the clearance 160 may substantially be constant along the length direction L starting from a specific position, as discussed above, wherein a substantially constant value may be established by providing a step in the insulating body 110 and/or in the conductor 120 at the specific position where the width shifts from zero to the desired width. A corresponding starting point for the clearance 160 by providing a respective step in the insulating body 110 and/or the bushing conductor 120 may also be used in combination with a tapering cross-sectional form of the clearance 160 such that the tapering abruptly begins at the specific position with a non-zero value and then gradually increases towards the end face 121F, thereby also obtaining a variation in width, however, starting at a well-defined position with well-defined non-zero value.

In some embodiments, the clearance 160 or at least a portion thereof may be filled with an elastic fill material, such as silicone rubber, (silicone) foam, conformable materials like silicone gel or oil, and the like, thereby still providing for elastic deformation capability of the connecting portion 121, while on the other hand providing for a certain degree of integrity of the clearance 160 with respect to incorporation of undesired substances, and the like. For example, a corresponding fill material may be provided after having assembled the bushing 100, thereby forming a ring-like fill material in the vicinity of the end face 121F, which may suffice for reducing the probability of incorporating undesired substances. In other cases, a respective fill material may be injected along a significant length of the clearance or into the entire clearance by any appropriate deposition techniques.

Figure 5A:
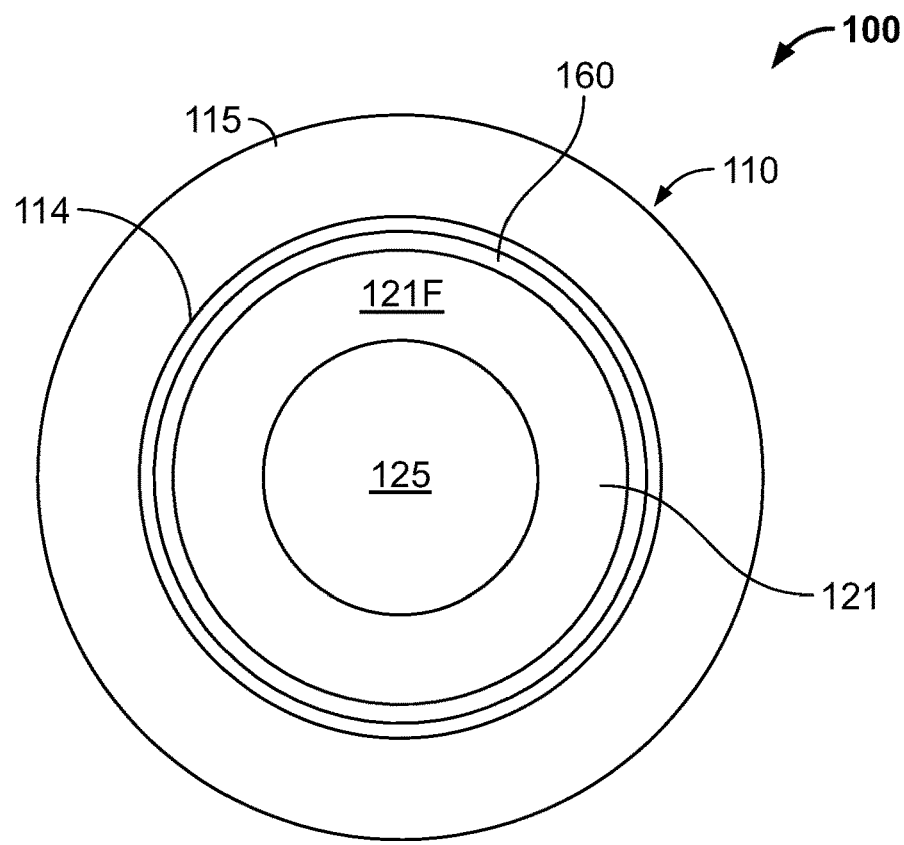
FIG. 5A is a sectional end view of the bushing.

FIG. 5A shows the bushing 100 at a position in which the clearance 160 is present between the connecting portion 121 and the insulating body 110. In this embodiment, the cross-sectional area of the end face 121F has an annular shape surrounding the inner bore 125, and the clearance 160 concentrically surrounds the connecting portion 121 and thus separates the shielding sheath 114 from the material of the connecting portion 121. Since the geometry of the entire configuration is radially symmetric with respect to the length direction, the elastic deformation capability of the portion 121 with respect to the insulating body 110 is substantially the same in any radial direction. Consequently, the connecting portion 121 may respond to mechanical "excitation" along any radial direction substantially without transferring mechanical stress into the respective portion of the insulating body 110. Consequently, even for a complex mechanical excitation regime of the connecting portion 121, when connected to the corresponding cable 140, the inventive elastic deformation capability may result in a significant or complete damping of mechanical stress transferred into the insulating body 110.

Figure 5B:
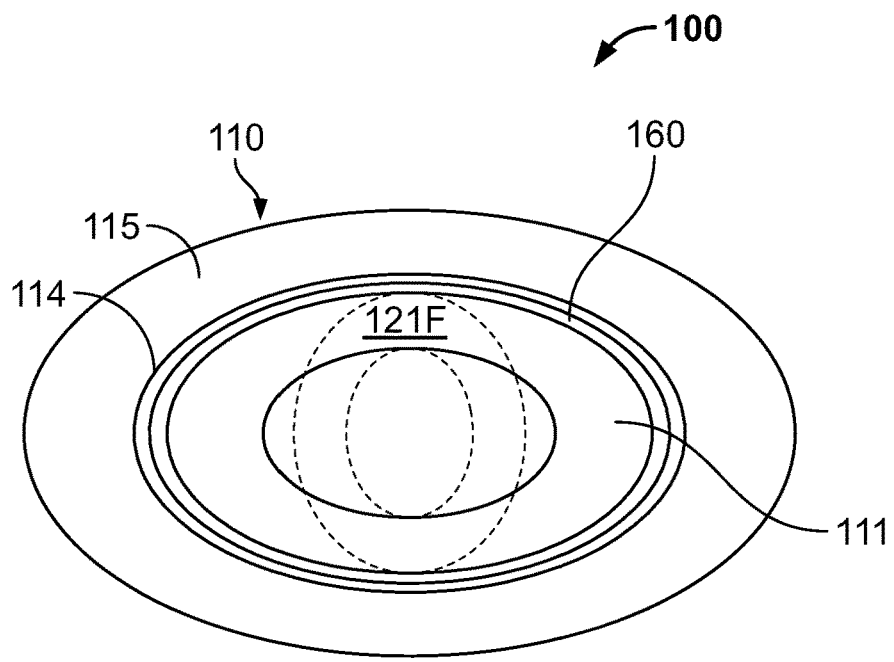
FIG. 5B is a sectional end view of the bushing according to another embodiment.

As shown in FIG. 5B, the geometric configuration is adapted to obtain a non-radial-symmetric configuration. Hence, an elastic deformation in one or more directions may be achieved more easily compared to other radial directions. For example, in the embodiment shown, the connecting portion 121 may be displaced more easily in the up/down direction of FIG. 5B, while it may exhibit a significantly stiffer behavior in the right-left direction of FIG. 5B. It should be appreciated that a corresponding geometric variation of the cross-sectional configuration may be established at any appropriate position along the length, in which the clearance 160 is established. On the other hand, as indicated by the dashed lines, at the very end of the portion 121 the geometric configuration may still be provided so as to comply with specific standards for connecting to the cable 140, which may, for instance, require a substantially circular geometry of the end face 121F. In this manner, the overall cross-sectional area of the bushing conductor 120 may be increased at any desired position along the length direction, thereby also providing the possibility of adjusting the "directionality" of the elastic deformation capability, while still maintaining the possibility of connecting to a standardized terminal portion or contact assemblies of external cables.

The bushing 100 may be formed in accordance with well-established techniques, for instance by forming the insulating body 110, possibly in combination with the shielding sheath 114, by any appropriate molding techniques, such as injection molding, wherein an appropriate insulating material, such as epoxy resin, may be combined with the shielding material, such as aluminum, thereby forming the insulating body as an integral part. On the other hand, the bushing conductor 120 may be formed as a separate component, for instance based on copper material, by using any appropriate manufacturing technique. Thereafter, the two components may be assembled, for instance by inserting the bushing conductor 120 into the insulating body. When referring to FIG. 3, the conductor 120 may be inserted from the left-hand side of FIG. 3 into the insulating body 110. In this manner, a tight mechanical connection may be established by form closure between the inner surface of the insulating body, for instance the shielding sheath 114, and the outer surface portion of the conductor 120 at areas, in which the elastic deformation capability is not present. In addition to or instead of a press fit or form fit between the sheath 114 and the conductor 120 form fit elements, such as radially oriented bolts, or material fit by soldering or welding may be used. In other cases the sheath 114 and the conductor 120 may initially be provided as an integral component and the clearance 160 may be formed by machining. During or after the assembly of these two components, as discussed above, optionally an elastic fill material may be incorporated into the clearance 160, if considered appropriate. Consequently, in illustrative embodiments a simple two-part design may be used for the bushing 100, thereby not unduly contributing to increased overall manufacturing cost, while nevertheless imparting significant decoupling capabilities to the connecting portion of the bushing conductor.

In an embodiment, the bushing 100 is configured to be used on an electrically driven vehicle for conveying electric power of 100 kW and higher, for instance for connecting a power supply cable 140 to a contact mechanism of the electrically driven vehicle. The bushing 100 is appropriately adapted to transfer power in the above-specified range, irrespective of the voltage used for the power supply and irrespective of the type of current, i.e., AC or DC, wherein the elastic deformation capability of at least the first connection portion 121 of the bushing conductor 120 provides for superior reliability during a moderately long lifetime. In some embodiments, the bushing 100 is adapted for power supply in trains requiring medium to high voltage compliance so that the housing external cable or contact assembly as well as for instance the insulating body 110 of the bushing 100 are appropriately adapted so as to accommodate the medium voltage and high voltage requirements typically encountered in train applications. In particular the inventive bushing may provide for superior reliability in train applications, since the strong mechanical influence of the typically used magnetic contactor assemblies, which may result in significant mechanical shocks and vibrations due to the collision of heavy contacts in the magnetic contactor assembly, may be "neutralized" to a high degree by the elastic or compliant behavior of the relevant portion of the bushing conductor 120. Similarly, in other present or future applications, significant electrical power may have to be supplied into specific locations of an electrically driven vehicle, such as vans, cars, and the like, wherein also significant mechanical stress may be involved due to specific vibrations caused internally or externally of the electric vehicle. It should be appreciated that in many presently available electric vehicles designed for road traffic or rail-bound traffic DC voltage may typically have to be supplied to respective components, such as motors, batteries, and the like. Also in this case the superior mechanical behavior of the bushing 100 may provide for enhanced reliability. In particular in DC high power applications superior reliability of the insulating characteristics of a corresponding bushing 100 may be of increased importance due to the non-self-extinguishing behavior of respective arcs that may occur upon opening/closing respective circuits.

What is claimed is:

1. A bushing, comprising:
  an insulating body having a first body end portion, a second body end portion, and a body center portion connecting the first body end portion and the second body end portion; and
  a bushing conductor coaxially extending within and mechanically coupled to the insulating body, the bushing conductor including:
    a first connecting portion having a first end face at the first body end portion,
  a second connecting portion having a second end face at the second body end portion, wherein a continuous clearance of varying width is provided at least one of between the first connecting portion and the first body end portion or between the second connecting portion and the second body end portion, and
    a center portion electrically and mechanically connecting the first connecting portion and the second connecting portion, the first connecting portion is elastically deformable with respect to the first body end portion along a radial direction and/or the second connecting portion is elastically deformable with respect to the second body end portion along the radial direction, the clearance extending continuously and increasing in width along a length direction of the bushing from a position proximate the center portion of the bushing to at least one of the first end face or the second end face.

2. The bushing of claim 1, wherein the clearance is at least partially filled with an elastic fill material and/or a compressible material.

3. The bushing of claim 1, wherein the clearance has a width in a range of up to 5.0 mm and/or up to 5% of a length of the first connecting portion and/or the second connecting portion.

4. The bushing of claim 1, wherein a form closure, a material fit, a force fit, or a mechanical fastening element is provided between a part of the bushing conductor and a part of the insulating body.

5. The bushing of claim 1, wherein the clearance gradually increases in width from the position proximate the center portion of the bushing to the first end face.

6. The bushing of claim 1, wherein the radial direction is determined by a non-radial-symmetric geometric configuration of a cross-section of at least one of the first connecting portion and the second connecting portion and/or a part of the center portion.

7. The bushing of claim 1, wherein a length of at least one of the first connecting portion and the second connecting portion that is elastically deformable is 15 mm to 300 mm.

8. The bushing of claim 1, wherein the insulating body has a shielding sheath forming an inner surface of the insulating body.

9. The bushing of claim 8, wherein the shielding sheath is formed of a metal that differs from a metal of the bushing conductor.

10. The bushing of claim 1, further comprising a mounting flange provided at the center portion for fixing the bushing to a housing.

11. The bushing of claim 10, wherein the mounting flange is provided at an axial position at which the bushing conductor and the insulating body are in contact with each other.

12. The bushing of claim 1, wherein the bushing conductor has an inner bore extending through an entire length of the bushing conductor.

13. The bushing of claim 1, wherein a size of the first end face is less than a size of the second end face.

14. The bushing of claim 1, wherein the bushing is configured to be used on an electrically driven vehicle for conveying electrical power of 100 kW and higher.

15. A bushing, comprising:
  an insulating body having a first body end portion, a second body end portion, a body center portion connecting the first body end portion and the second body end portion, and a shielding sheath forming an inner surface of the insulating body and varying in thickness along a length direction of the bushing; and
  a bushing conductor coaxially extending within and mechanically coupled to the insulating body, the bushing conductor including:

a first connecting portion having a first end face at the first body end portion, a second connecting portion having a second end face at the second body end portion, and a center portion electrically and mechanically connecting the first connecting portion and the second connecting portion, the first connecting portion is elastically deformable with respect to the first body end portion along a radial direction and/or the second connecting portion is elastically deformable with respect to the second body end portion along the radial direction.

16. The bushing of claim 15, wherein a clearance is disposed continuously at least one of between the first connecting portion and the first body end portion or between the second connecting portion and the second body end portion.

17. The bushing of claim 16, wherein the clearance has a width varying with the thickness of the shielding sheath.

* * * * *